United States Patent [19]

Kletsel et al.

[11] 4,453,190
[45] Jun. 5, 1984

[54] METHOD OF SHORT CIRCUIT PROTECTION OF ELECTRICAL THREE-PHASE MACHINE AND DEVICE THEREFOR

[75] Inventors: Mark Y. Kletsel, Pavlodar; Valentin E. Polyakov, Sverdlovsk; Alexandr N. Novozhilov; Ivan N. Solodukhin, both of Pavlodar; Yakov Z. Chepeljuk, Ekibastuz; Dmitry F. Baida, Ermak, all of U.S.S.R.

[73] Assignee: Pavlodarsky Industrialny Institut, Pavlodar, U.S.S.R.

[21] Appl. No.: 371,195

[22] Filed: Apr. 23, 1982

[51] Int. Cl.³ .................................................. H02H 7/08
[52] U.S. Cl. ......................................... 361/31; 361/30; 361/84; 361/87
[58] Field of Search ..................... 361/31, 84, 82, 87, 361/23, 24, 36, 77

[56] References Cited

U.S. PATENT DOCUMENTS 3,522,478  8/1970  Reis.
3,697,811  10/1972  Little ....................................... 361/82
3,970,897  7/1976  Tamir et al. ........................... 361/23

FOREIGN PATENT DOCUMENTS 2539451  3/1977  Fed. Rep. of Germany ........ 361/82

OTHER PUBLICATIONS

G. G. Gimoian, Relay Protection of Mining Electrical Installations, Moscow, Nedra Publ., 1978.

Primary Examiner—Patrick R. Salce
Attorney, Agent, or Firm—Lilling & Greenspan

[57] ABSTRACT

A method of short-circuit protection of an electrical three-phase machine, realized in a short-circuit protection device for a three-phase electrical machine, provides that phase currents are formed in phases of the stator winding of a three-phase electrical machine and, concurrently, a magnetic flux is produced by the end loops of coil groups of each phase in the stator winding, and a reverse current is separated from phase currents by a reverse current discriminating unit. Afterwards, current measuring and comparing units simultaneously measure the reverse current and the total electromotive force, produced by the magnetic flux in conditions excluding short-circuits in the stator winding and added up by a means for summing and converting magnetic fluxes into the electromotive force. In case the measured magnitude of the current and the value of the electromotive force exceed the maximum, three-phase electrical machine disconnection signal shapers produced respective signals which cut out the machine.

13 Claims, 10 Drawing Figures

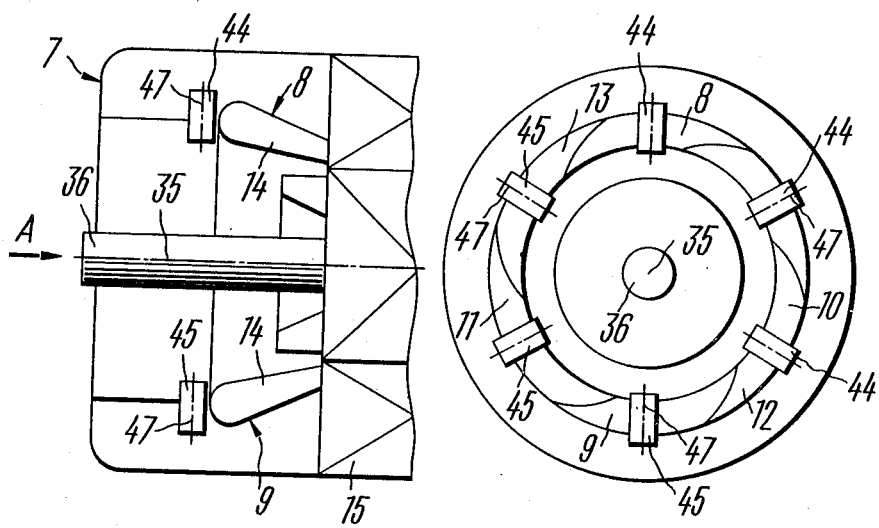

METHOD OF SHORT CIRCUIT PROTECTION OF ELECTRICAL THREE-PHASE MACHINE AND DEVICE THEREFOR

FIELD OF THE INVENTION

The present invention relates to electrical power engineering and, in particular, to methods of short circuit protection of three-phase electrical machines and devices realizing said methods.

This invention can be used advantageously for short circuit protection of three-phase electrical machines and, primarily, for protection against loop short circuits in the stator winding.

DESCRIPTION OF THE PRIOR ART

Modern technology requires an ever greater amount of electrical machines, in particular, three-phase electrical machines of larger power. Problems of safe operation of such electrical machines become more urgent, particularly when such machines operate in explosion and fire hazardous mediums. There are also maintenance cost problems to consider. In consequence, reliable operation of electrical machines in terms of short circuit protection comes to the foreground. The existing methods of protection and devices realizing them cannot, however, ensure timely detection of short circuits in the stator winding of a three-phase electrical machine.

Known in the art is a method of short circuit protection of a three-phase electrical machine (cf., for example, G. G. Gimoian, Relay Protection of Mining Electrical Installations, Moscow, Nedra Publ., 1978), comprising the following steps: formation of phase currents in phases of the stator winding of a three-phase electrical machine, concurrent generation of a magnetic flux by end loops of coil groups of each phase of the stator winding, separation of reverse current from phase currents, measurement of said reverse current, comparison of said reverse current with the maximum reverse current separated from phase currents in short-circuit-free conditions, and generation of a signal to disconnect the three-phase electrical machine when the measured reverse current exceeds said maximum current volume.

Also known in the art is a short circuit protection device for three-phase electrical machines, which realizes said method (of, for example, G. G. Gimoian, Relay Protection of Mining Electrical Installations, Moscow, Nedra Publ., 1978) and comprises three current converters, whose inputs are connected to respective phases of the electrical three-phase machine, and several series-connected units: a reverse current discrimination unit coupled to the current converters, a current measuring and comparing unit, and a three-phase electrical machine disconnecting signal shaper.

But, in accordance with this method and the device realizing it, the reverse currents separated from phase currents can occur in short-circuit-free conditions and reach, during the start of the three-phase electrical machine, for example, magnitudes of the order of the reverse currents generated during loop short circuits. The protection should therefore be coarsened and the sensitivity of the device deteriorates.

The known method and device for its realization are deficient in that loop short circuits do not disconnect the electrical machine, leading to interphase short circuits and, consequently, to stator winding failure. The disconnection signal is generated only at this stage, thus making the response of the device too slow.

SUMMARY OF THE INVENTION

The object of this invention is to provide a method of short circuit protection of a three-phase electrical machine offering a more sensitive short circuit portection for such a machine.

One more object of the invention is to provide a device for short circuit protection of a three-phase electrical machine in order to realize the method of short circuit protection and to make the short circuit protection of such a machine more sensitive.

Still one more object of this invention is to make the protection of a three-phase electrical machine against short circuits faster.

This is attained by a method of short circuit protection of a three-phase electrical machine, comprising the following steps; formation of phase currents in phases of the stator winding of the three-phase electrical machine, concurrent generation of a magnetic flux by end loops of coil groups of each phase of the stator winding, separation of the reverse current from phase currents, measurement of said reverse current, comparison of said reverse current with the maximum reverse current separated from phase currents in short-circuit-free conditions, and, when the measured reverse current exceeds said maximum reverse current volume, formation of a signal to disconnect the three-phase electrical machine. According to the invention, simultanesouly with measuring the reverse current the total electromotive force is measured, which is produced by the magnetic flux of the end loops of the coil groups of all three phases of the stator winding, said electromotive force is compared with the maximum electromotive force produced by said magnetic flux in conditions excluding short circuits in the stator winding of the three-phase electrical machine, and, when the measured electromotive force value exceeds the value of the electromotive force at its maximum, an additional signal disconnecting the three-phase electrical machine is produced.

This is also attained by a device for short circuit protection of a three-phase electrical machine, which realizes the proposed method and comprises three current converters, the input of each converter being connected to a respective phase of the three-phase electrical machine, and several units connected in series: a reverse current discrimination unit coupled to the current converters, a current measuring and comparing unit and a three-phase electrical machine disconnection signal shaper. According to the invention, the device also comprises the following series-connected units: a means for summing and converting magnetic fluxes into electromotive force, which is electromagnetically coupled to the end loops of coil groups of each phase of the stator winding, an additional current measuring and comparing unit, and an additional shaper of a signal for disconnection of the three-phase electrical machine.

Advisably, in the proposed device the means for summing and converting magnetic fluxes into electromotive force should comprise a frame and an electromagnetic sensor coupled to the additional current measuring and comparing unit, the frame and the sensor being mechanically secured together.

Desirably, the frame should be made of a dielectric as a cylindrical coil attached inside the three-phase electrical machine so that the end faces of the coil are perpendicular to the axis of rotation of the rotor of the three-phase electrical machine and the coil axis coincides therewith, the electromagnetic sensor being a winding enveloping the coil.

Preferably, the frame should be made as a ring of a conductive material, whose plane is perpendicular to the axis of rotation of the rotor of the three-phase electrical machine, the geometrical center being located on said axis, and the electromagnetic sensor should comprise a ferrite core enveloping the ring and a winding enveloping the ferrite core.

Advisably, the means for summing and converting should comprise parallel-connected magnetic flux transducers whose number is equal to the number of pairs of the coil groups, each said transducer being electromagnetically coupled to at least one pair of the coil groups and connected to said additional measuring and comparing unit.

Desirably, each magnetic flux transducer should be electromagnetically coupled to a pair of the coil groups of a respective phase.

Also desirably, each magnetic flux transducer should be electromagnetically coupled to a pair of coil groups of different phases.

Most advisably, when each magnetic flux transducer is electromagnetically coupled with two pairs of coil groups, each magnetic flux transducer should be electromagnetically coupled to one pair composed of coil groups belonging to one phase and to another pair composed of one of the said coil groups and a coil group belonging to another phase.

Preferably, each magnetic flux transducer should comprise at least one pair of windings, some like leads thereof being joined in a point of connection, the longitudinal axis of each winding being parallel to the axis of rotation of the rotor of the three-phase electrical machine.

The proposed invention permits detection of loop short circuits in the stator winding of an electrical machine at the exact moment such short circuits occur, thus contributing to better sensitivity and fast response of the proposed device.

BRIEF DESCRIPTION OF THE DRAWINGS

The invention will now be described in detail with reference to a specific embodiment thereof, taken in conjunction with the accompanying drawings, wherein:

FIG. 9 illustrates an arrangement of transducer windings in relation to the coil groups and the axis of rotation of the rotor of a three-phase electrical machine, according to the invention; and FIG. 10 is a view taken along the arrow A of FIG. 9, according to the invention.

DETAILED DESCRIPTION OF THE INVENTION

Figure 1:
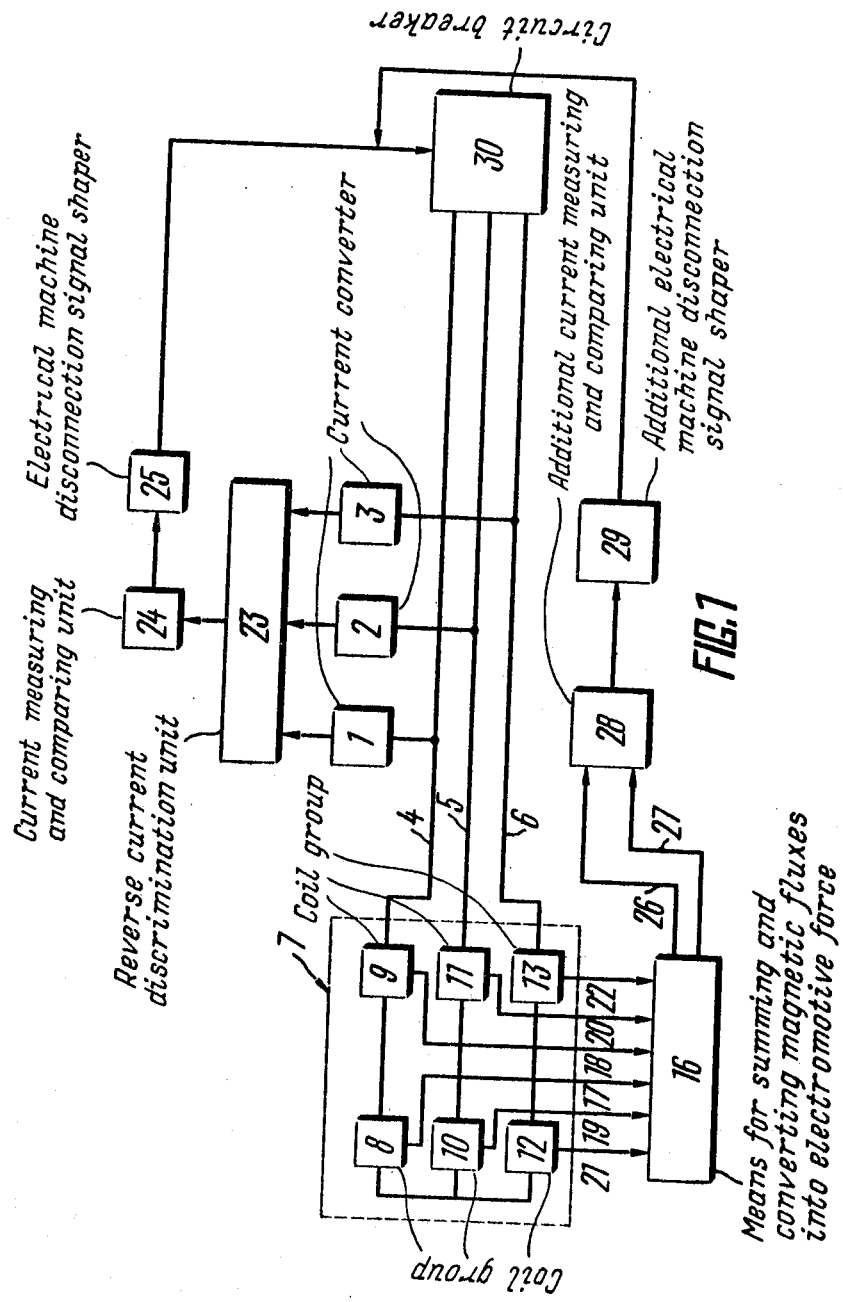
FIG. 1 is a block diagram of a device for short circuit protection of a three-phase electrical machine, which realizes the proposed method, according to the invention.

A method of short circuit protection of a three-phase electrical machine comprises the following steps: formation of phase currents in phases of the stator winding of the three-phase electrical machine, concurrent production of a magnetic flux by the end loops of coil groups of each phase of the stator winding, and separation of reverse current from the phase currents. Then the reverse current and the total electromotive force, produced by the magnetic flux of the end loops of the coil groups of all three phases of the stator winding in conditions excluding short circuits in the stator winding, are simultaneously measured. When the reverse current and the electromotive force exceed their maximum values, signals to disconnect the three-phase electrical machine are generated.

A device for short circuit protection of a three-phase electrical machine, which realizes the proposed method, comprises current converters 1, 2 and 3 (FIG. 1) connected to phases 4, 5 and 6 of the three-phase electrical machine 7, respectively. The phases 4, 5 and 6 have, respectively, coil groups 8 and 9, 10 and 11, and 12 and 13. Each coil group 8, 9, 10, 11, 12 and 13 comprises loops 14 (FIG. 2) located in the ends of a winding of a stator 15 of the electrical machine 7. The loops 14 (FIG. 2) of all coil groups 8, 9, 10, 11, 12 and 13 are electromagnetically coupled to a means 16 for summing and converting magnetic fluxes into an electromotive force by the inputs 17, 18, 19, 20, 21 and 22 thereof, respectively. Outputs of the current converters 1, 2 and 3 are connected to a reverse current discrimination unit 23. The unit 23 is connected to a current measuring and comparing unit 24. The unit 24 is connected to a shaper 25 of a signal for disconnection of the three-phase electrical machine 7. Outputs 26 and 27 of the means 16 are connected to an additional measuring and comparing unit 28. The additional unit 28 is connected to an additional shaper 29 of a signal for disconnection of the three-phase electrical machine 7.

The signal shapers 25 and 29 and the phases 4, 5 and 6 are connected to a circuit breaker 30 of the three-phase electrical machine 7.

Figure 2:
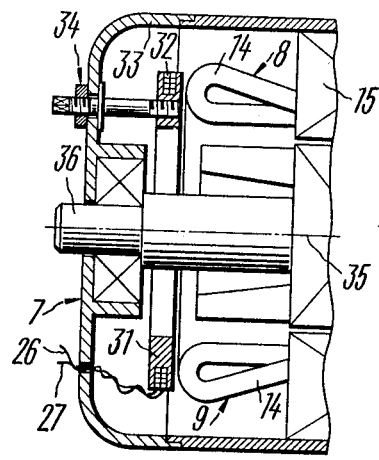
FIG. 2 is a longitudinal sectional view, illustrating the end of a three-phase electrical machine having a means for summing and converting magnetic fluxes into electromotive force, made as a reel with a winding.
Figure 3:
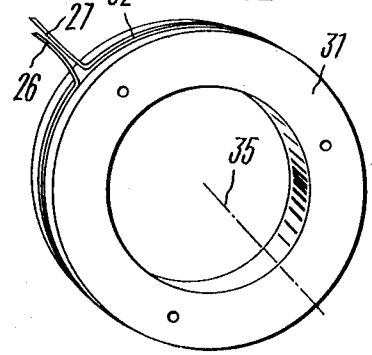
FIG. 3 is a perspective view of a reel with a wire, according to the invention.

The means 16 for summing and converting magnetic fluxes into an electromotive force comprises a frame which is a cylindrical reel 31 (FIGS. 2 and 3) made of a dielectric, and electromagnetic sensor which is a winding 32 wound on the reel 31. The ends of the winding 32 are outputs 26 and 27 of the means 16. The reel 31 is secured to an end shield of the electrical machine 7 by means of bolts 34 so that the butt ends of the reel 31 are perpendicular to the axis 35 of rotation of a rotor 36 of the electrical machine 7.

Figure 4:
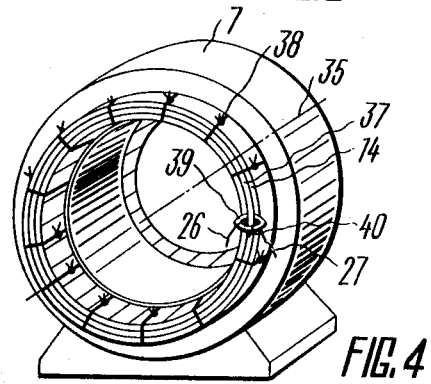
FIG. 4 is an oxonometric view of the end portion of a three-phase electrical machine equipped with a means for summing and converting magnetic fluxes into electromotive force, made as a ring featuring a ferrite core, according to the invention.

In another embodiment of the means 16 for summing and converting magnetic fluxes into an electromotive force the frame is a ring 37 (FIG. 4) attached by straps 38 to the loops 14 so that the plane of the ring 37 is perpendicular to the axis 35, whereas the geometrical center of the ring 37 coincides with the axis 35. The electromagnetic sensor comprises a ferrite core 39 made as a ring enveloping the ring 37. A winding 40 is wound about the core 39, and the ends of the winding 40 are the outputs 26 and 27 of the means 16.

Figure 5:
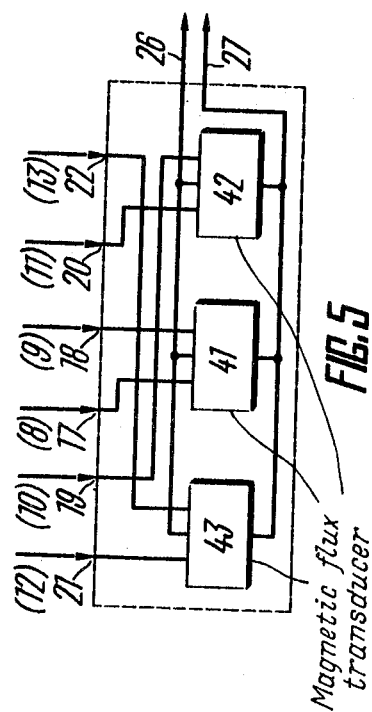
FIG. 5 is a block diagram of a means for summing and converting magnetic fluxes into electromotive force, equipped with magnetic flux transducers connected to the coil groups belonging to one phase, according to the invention.

In still another embodiment of the means 16 (FIGS. 1 and 5) for summing and converting magnetic fluxes into an electromotive force comprises three magnetic flux transducers 41, 42 and 43 whose number is equal to the number of pairs of the coil groups 8 and 9, 10 and 11, and 12 and 13 of the respective phases 4, 5 and 6. Each of the transducers 41, 42 and 43 is electromagnetically coupled to a respective pair of coil groups 8 and 9 (phase 4), 10 and 11 (phase 5), and 12 and 13 (phase 6). Outputs of the transducers 41, 42 and 43 are the outputs 26 and 27 of the means 16.

Figure 6:
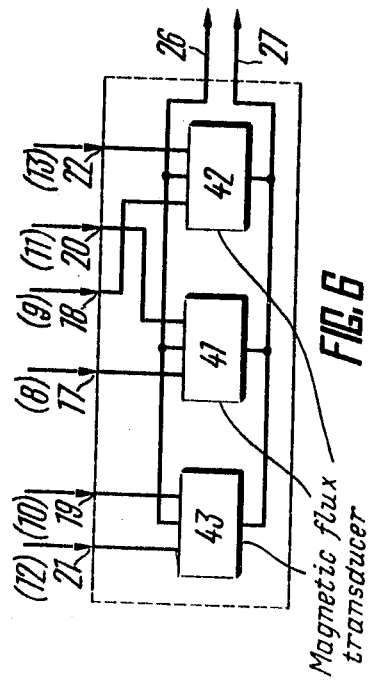
FIG. 6 is a block diagram of a means for summing and converting magnetic fluxes into electromotive force, of the type shown in FIG. 5, equipped with magnetic flux transducers connected to the coil groups belonging to different phases, according to the invention.

In one more embodiment of the means 16 (FIGS. 1 and 6) for summing and converting magnetic fluxes into electromotive force each transducer 41, 42 and 43 is electromagnetically coupled to a respective pair of the coil groups 8 and 11, 9 and 13, and 10 and 12 of different phases 4 and 5, 4 and 6, and 5 and 6, respectively.

Figure 7:
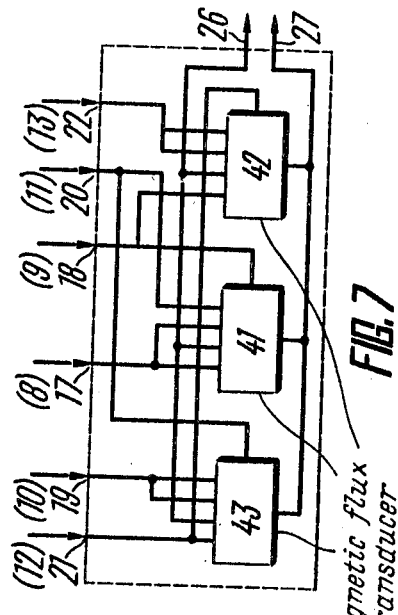
FIG. 7 is a block diagram of a means for summing and converting magnetic fluxes into electromotive force, of the type shown in FIG. 5, equipped with magnetic flux transducers connected to the coil groups belonging to one and different phases at the same time, according to the invention.

In still one more embodiment of the means 16 (FIGS. 1 and 7) for summing and converting magnetic fluxes into electromotive force the transducer 41 is electromagnetically coupled to two pairs of the coil groups 8 and 9 (phase 4), and 8 and 11 (phases 4 and 5, respectively); the transducer 42 is electromagnetically coupled to two pairs of the coil groups 12 and 13 (phase 6) and 9 and 13 (phases 4 and 6, respectively); and, the transducer 43 is electromagnetically coupled to two pairs of the coil groups 10 and 11 (phase 5) and 10 and 12 (phases 5 and 6, respectively).

Figure 8:
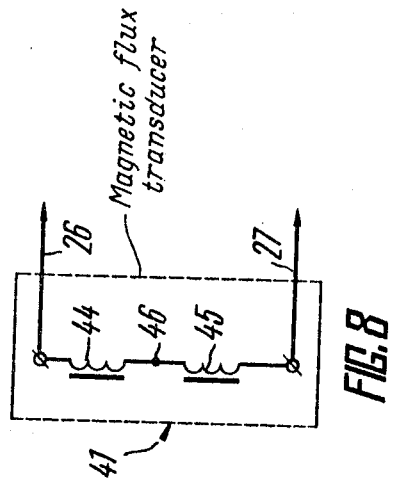
FIG. 8 is a schematic circuit diagram of a magnetic flux transducer, according to the invention.

Each of the transducers 41, 42 and 43 comprises windings 44 and 45 (FIG. 8). Some like ends of the windings 44 and 45 are joined in the connection point 46, while other like ends are the outputs 26 and 27 of the means 16.

Longitudinal axes 47 (FIGS. 8, 9 and 10) of all windings 44 and 45 are perpendicular to the rotation axis 35 of the rotor 36.

The device for short circuit protection of a three-phase electrical machine, which realizes the proposed method, operates as follows.

The following faults of a stator winding of a three-phase electrical machine are considered to be the most common:

turn-to-turn short circuit in the end portion of the stator winding in any phase;
phase shorts in the stator winding;
phase shorts at the output of the three-phase electrical machine;
phase shorts in the cable connecting the electrical machine and the circuit breaker; and
double ground shorting of the stator winding.

In case of a turn-to-turn short between the loops 14 (FIG. 2) and phase shorts in the winding of the stator 15, when the number of shorted loops exceeds 20–30% of the total number of the loops 14, a signal is generated at the output of the reverse current discrimination unit 23 (FIG. 1). The strength of this signal is compared, in the unit 24 for current measuring and comparing, to the maximum volume of the reverse current separated from phase currents in fault-free conditions. The signal is then delivered to the three-phase electrical machine disconnection signal shaper 25 which generates the signal to the circuit breaker 30.

In case the loops 14 (FIG. 2) of the stator 15 of the electrical machine 7 are shorted, the means 16 for summing and converting magnetic fluxes into electromotive force adds up and converts the magnetic fluxes produced inside the electrical machine 7 by the currents of the loops 14 of the coil groups 8, 9, 10, 11, 12 and 13 of the end portions of the winding of the stator 15 of the phases 4, 12 and 6 into an electromotive force. This electromotive force is supplied from the outputs 26 and 27 of the means 16 into the additional measuring and comparing unit 28. In the unit 28 the electromotive force is compared to the maximum electromotive force obtained in conditions excluding short circuits in the winding of the stator 15 of the electrical machine 7. As the electromotive force at the outputs 26 and 27 of the means 16 in case of the short circuit under discussion is greater than the above mentioned maximum value, a signal is produced at the output of the unit 28 and delivered to the shaper 29 of a signal for disconnection of the three-phase electrical machine. The signal shaper 29 generates a signal to engage the circuit breaker 30.

When magnetic fluxes of all coil groups 8, 9, 10, 11, 12 and 13 (FIGS. 1 and 2) are summed simultaneously, the means 16 for summing and converting magnetic fluxes into electromotive force operates as follows.

In case of a turn-to-turn short in any coil group 8, 9, 10, 11, 12 and 13, the magnetic flux, produced by the current in the loops thereof, pierces the winding 32 of the coil 31 (FIGS. 1, 2, 3) and electromotive force is generated at the ends thereof. This electromotive force is greater than the maximum electromotive force induced at the ends of the winding 32 in conditions excluding short circuits in the winding of the stator 15.

In large-size three-phase electrical machines in case of a turn-to-turn short in any of the coil groups 8, 9, 10, 11, 12 and 13 of the winding of the stator 15, the magnetic flux induced by the current in the loops 14 pierces the ring 37 (FIG. 4) and produces a current which generates a magnetic field around the ring 37. Current flows through the ferrite core 39 and produces, at the ends of the winding 40 (FIG. 4), an electromotive force greater than maximum electromotive force produced at these ends in conditions excluding short circuits in the winding of the stator 15.

When magnetic fluxes of individual coil groups 8, 9, 10, 11, 12 and 13 are summed, the means 16 for summing and converting magnetic fluxes into electromotive force operates as follows.

In one instance, the magnetic flux is supplied from the pairs of coil groups 8 and 9, 10 and 11, and 12 and 13 (FIGS. 1 and 5) of one phase 4, 5 or 6, respectively. The signal from the groups 8 and 9 is fed through the inputs 17 and 18 to the transducer 41, from the groups 10 and 11 through the inputs 19 and 20 to the transducer 42, and from the groups 12 and 13 through the inputs 21 and 22 to the transducer 43. In consequence, the electromotive force is produced at the outputs 26 and 27 of the means 16, which is geater than the maximum electromotive force produced at these outputs 26 and 27 in conditions excluding short circuits in the winding of the stator 15.

In another instance, the magnetic flux is supplied from the pairs of the coil groups 8 and 11, and 9 and 13, and 10 and 12 (FIG. 6) of different phases 4 and 5, 4 and 6, and 5 and 6, respectively. The signal from the groups 8 and 11 is fed through the inputs 17 and 20 to the transducer 41, from groups 9 and 13 through the inputs 18 and 22 to the transducer 42, and from groups 10 and 12 through the inputs 19 and 21 to the transducer 43.

Further operation of the means 16 is similar to that described above.

In one more instance, the magnetic flux is supplied from two pairs of the coil groups 8 and 9 (phase 4) and 8 and 11 (phases 4 and 5, respectively) to the transducer 41 (FIG. 7), from two pairs of the coil groups 12 and 13 (phase 6) and 9 and 13 (phases 4 and 6, respectively) to the transducer 42, and from two pairs of the coil groups 10 and 11 (phase 5) and 10 and 12 (phases 5 and 6, respectively) to the transducer 43.

Further operation of the means 16 is similar to that described above.

Transducers 41, 42 and 43 operate as follows; consider magnetic flux transducer 41 as an example.

The windings 44 and 45 (FIGS. 8, 9 and 10) are pierced by the magnetic flux generated by the coil groups 8 and 9, respectively. In case of faults in the winding of the stator 15, magnetic fluxes from the groups 8 and 9 after considerably and, consequently, the electromotive forces induced in the windings 44 and 45 are different. The electromotive force at the ends (outputs 26 and 27 of the means 16) of the windings 44 and 45 is greater than the above mentioned maximum value.

The present invention permits significant cuts in the cost of maintenance and repair of three-phase electrical machines equipped with sectionalized windings.

In addition, the present invention permits safer operation of the three-phase electrical machines.

What is claimed is:

1. A method for short circuit protection of a three-phase electrical machine, comprising the following steps in the following order:
    forming phase currents in phases of a stator winding of a three-phase electrical machine;
    producing a magnetic flux by loops of end portions of coil groups of each said phase of said winding of said stator concurrently with said forming of said phase currents;
    separating a reverse current from said phase currents;
    producing an electromotive force by said magnetic flux in conditions excluding short circuits in said winding of said stator;
    measuring simultaneously said reverse current and said electromotive force, and
    generating signals disconnecting said three-phase electrical machine in case said measured reverse current and said measured electromotive force exceed a maximum value.

2. A device for short circuit protection of a three-phase electrical machine, having loops of end portions of coil groups for each of three phases of a stator winding, comprising:
    a first current converted having an input and an output and connected by said input to the first of said phases;
    a second current converter having an input and an output and connected by said input to the second of said phases;
    a third current converter having an input and an output and connected by said input to the third of said phases;
    a reverse current discrimination unit having an input and an output and connected by said input to said outputs of said current converters;
    a first current measuring and comparing unit having an input and an output and connected by said input to said output of said reverse current discrimination unit;
    a first three-phase electrical machine disconnection signal shaper having an input and an output and connected by said input to said output of said first current measuring and comparing unit;
    a circuit breaker of said three-phase electrical machine, connected to said output of said first disconnection signal shaper and to said phases;
    a means for summing and converting magnetic fluxes into electromotive force, having inputs whose number is equal to the number of said coil groups, and a first output, and a second output, and connected by said inputs to said loops of said coil groups;
    a second current measuring and comparing unit having a first input, a second input, and an output, and connected by said inputs to said first and second outputs of said means for summing and converting magnetic fluxes into electromotive force;
    a second three-phase electrical machine disconnection signal shaper having an input and an output, and connected by said input to said output of said second current measuring and comparing unit, and by said output to said circuit breaker of said electrical machine.

3. A device as claimed in claim 2, wherein said means for summing and converting magnetic fluxes into electromotive force comprises:
    a frame;
    a sensor mechanically connected to said frame.

4. A device as claimed in claim 2, wherein said means for summing and converting magnetic fluxes into electromotive force comprises:
    parallel-connected magnetic flux transducers whose number is equal to the number of said coil groups, each transducer having a first input, a second input, a first output, a second output, and being electromagnetically coupled by said inputs to at least one of said pairs of said coil groups.

5. A device as claimed in claim 3, wherein said frame is made of a dielectric as a cylindrical reel having an axis and secured inside said three-phase electrical machine so that butt faces of said reel are perpendicular to the rotational axis of the rotor of said three-phase electrical machine and said rotational axis coincides with said axis of said reel, said electromagnetic sensor being a winding enveloping said reel.

6. A device as claimed in claim 3, wherein said frame is a ring of a conducting material, whose plane is perpendicular to said rotational axis of said rotor of said three-phase electrical machine and the geometrical center is located on said axis, and said sensor comprises a ferrite core enveloping said ring and a winding enveloping said ferrite core.

7. A device as claimed in claim 4, wherein said inputs of each said magnetic flux transducer are electromagnetically coupled to the pair of said coil groups of a respective phase.

8. A device as claimed in claim 4, wherein said inputs of each said magnetic flux transducer are electromagnetically coupled to a pair from said coil groups belonging to two different phases.

9. A device as claimed in claim 4, wherein, when each said magnetic flux transducer is electromagnetically coupled to two pairs from said coil groups, each said magnetic flux transducer is electromagnetically coupled to one pair composed of said coil groups belonging to one of said phases and to another pair composed of one of said coil groups of said coil group belonging to another phase.

10. A device as claimed in claim 4, wherein each said magnetic flux transducer comprises at least one pair of windings, each having two leads and a longitudinal axis, said like leads of said windings being joined in a connection point, and said longitudinal axis of each said winding being parallel to said rotational axis of said rotor of said electrical machine.

11. A device as claimed in claim 7, wherein each said magnetic flux transducer comprises at least one pair of windings, each having two leads and a longitudinal axis, said like leads of said windings being joined in a connection point and said longitudinal axis being parallel to said rotational axis of said rotor of said three-phase electrical machine.

12. A device as claimed in claim 8, wherein each said magnetic flux transducer comprises at least one pair of windings, each having two leads and a longitudinal axis, said like leads of said windings being joined in a connection point; said longitudinal axis is parallel to said rotational axis of said rotor of said three-phase electrical machine.

13. A device as claimed in claim 9, wherein each said magnetic flux transducer comprises at least one pair of windings, each having two leads and a longitudinal axis, said like leads of said windings being joined in a connection point, and said longitudinal axis being parallel to said rotational axis of said rotor of said three-phase electrical machine.

* * * * *